United States Patent [19]

Nishio et al.

[11] Patent Number: 4,999,157
[45] Date of Patent: Mar. 12, 1991

[54] METHOD FOR MOLDING POWDERS

[75] Inventors: Hiroaki Nishio; Akira Kato; Sazo Nakamura, all of Kawasaki, Japan

[73] Assignee: NKK Corporation, Tokyo, Japan

[21] Appl. No.: 488,701

[22] Filed: Mar. 5, 1990

[30] Foreign Application Priority Data

Jun. 22, 1989 [JP] Japan ............................. 1-158339

[51] Int. Cl.⁵ ............................................ B22F 1/00
[52] U.S. Cl. ........................................ 419/68; 419/60; 419/66; 249/65; 249/112; 249/127; 249/183; 264/220; 264/102; 264/571; 264/DIG. 78; 264/219; 425/405.1; 425/405.2; 425/DIG. 14
[58] Field of Search ................. 419/66, 68, 60; 264/219, 102, 220, 571; 425/405.2, 405.1, DIG. 14; 249/65, 112, 127, 183

[56] References Cited

U.S. PATENT DOCUMENTS

| | | | |
|---|---|---|---|
| 4,552,779 | 11/1985 | McClure | 427/2 |
| 4,582,682 | 4/1986 | Betz et al. | 419/68 |
| 4,612,163 | 9/1986 | Nishio et al. | 419/68 |
| 4,615,855 | 10/1986 | Orlowski et al. | 264/221 |
| 4,761,264 | 8/1988 | Nishio et al. | |
| 4,777,002 | 10/1988 | Putz | 264/226 |
| 4,812,278 | 3/1989 | Natori et al. | 264/221 |
| 4,927,600 | 5/1990 | Miyashita et al. | 419/68 |

FOREIGN PATENT DOCUMENTS

| | | |
|---|---|---|
| 0249936 | 12/1987 | European Pat. Off. . |
| 62-286713 | 12/1987 | Japan . |
| 62-294103 | 12/1987 | Japan . |
| 62-297402 | 12/1987 | Japan . |

Primary Examiner—Brooks H. Hunt
Assistant Examiner—Leon Nigohosian, Jr.
Attorney, Agent, or Firm—Frishauf, Holtz, Goodman & Woodward

[57] ABSTRACT

A method for molding powders comprises the steps of forming a mold support having at least an opening and a cavity, forming a film of latex on inner surfaces of the mold support by pouring the latex from the opening into the cavity of the mold support and discharging a substantial portion of the latex poured into the cavity, forming a thin-wall resilient mold inside the mold support by drying the film of latex formed, charging powders as materials for a compact from the opening into the thin-wall resilient mold, exhausting air out of the thin-wall resilient mold filled up with the powders through the opening and sealing the opening of the thin-wall resilient mold, separating the thin-wall resilient mold filled up with the powders from the mold support, and subjecting the thin-wall resilient mold to a cold isostatic press method treatment.

23 Claims, 1 Drawing Sheet

METHOD FOR MOLDING POWDERS

BACKGROUND OF THE INVENTION

1. Field of the Invention

The present invention relates to a method for molding metallic powder or ceramic powder, and more particularly to a method for molding powders by the use of a thin-wall resilient mold filled up with powders.

2. Description of the Prior Arts

The cold isostatic press method (hereinafter, referred to as "C.I.P. method") is well-known as a method for molding powders wherein a resilient mold made of rubber or the like is filled up with powders such as metallic powder, ceramic powder or the like and sealed, and then an isostatic press is applied to the resilient mold by the use of a pressure medium such as water, oil or the like at ordinary temperatures. However, some idea is required to obtain a compact of desirable shape so that the resilient mold cannot be deformed by weight of powders. Further, a method, wherein a thin-wall resilient mold and a ventilative mold support having an inside shape similar to the shape of the resilient mold are employed, is disclosed in a Japanese Patent Publication Laid Open No. 297402/87. In this method, said thin-wall resilient mold is inserted into said mold support and put close to the inner surface of the mold support by holding the outer surface of the mold support under a negative pressure whereby a shape of the mold is kept. After said mold has been filled up with powder materials, air in the resilient mold has been exhausted and the resilient mold has been sealed, said mold support is removed. After said thin-wall resilient mold holding powder materials therein has been subjected to the cold isostatic press, the thin-wall resilient mold is removed, thereby a compact is prepared.

Initially, problems of the prior art methods for molding powders will be described. In a method of imparting a thickness and strength to the resilient mold, since a degree of contraction of the resilient mold relative to a pressure applied thereto is different from a degree of contraction of a fill-up of powders inside the resilient mold, to which a pressure is applied, the resilient mold and the fill-up do not contract isotropically. Accordingly, the compact is required to be subjected to considerable machining in order to obtain a desired shape and a dimensional accuracy. On the other hand, when a method, wherein the resilient mold with powder is subjected to the C.I.P. treatment, is employed after a thin-wall resilient mold having been previously formed has been supported by a mold support, said thin-wall resilient mold has been filled up with powder and said mold support has been separated from the thin-wall resilient mold, a great increase of accuracy is observed in comparison with the above-described case where the C.I.P. treatment is carried out by the use of the resilient mold having a predetermined thickness and strength (the Japanese Patent Publication Laid Open No. 297402/87).

However, since the resilient mold which is inserted into a ventilative mold support similar in shape to the resilient mold is expanded by the use of a difference in pressures inside and outside the resilient mold and put close to the inner surface of the ventilative mold support, there occurs a phenomenon such that the resilient mold expands, not moving to positions corresponding to due positions of the inner surface of the mold support similar in shape to the resilient mold. When the resilient mold, in which said phenomenon takes place, is subjected to the C.I.P. treatment as it is, there occurs an anisotropic contraction and creases of the resilient mold. The more a desired shape of a compact becomes complicated, the greater this problem is posed.

SUMMARY OF THE INVENTION

It is an object of the present invention to overcome difficulties in the prior art methods for molding powders and to provide a method for molding powders wherein an anisotropical contraction of a compact due to a C.I.P. treatment is decreased to obtain a compact of desired shape and dimensional accuracy.

To accomplish the foregoing object, the present invention provides a method for molding powders comprising the steps of:

forming a mold support having at least an opening and a cavity;

forming a film of latex on inner surfaces of said mold support by pouring said latex from said opening into said cavity of the mold support and discharging a substantial portion of said latex poured into the cavity;

forming a thin-wall resilient mold inside said mold support by drying said film of latex formed;

charging powders as materials for a compact from said opening into said thin-wall resilient mold;

exhausting air out of the thin-wall resilient mold filled up with the powders through said opening and sealing the opening of the thin-wall resilient mold;

separating said thin-wall resilient mold filled up with the powders from said mold support; and subjecting said thin-wall resilient mold to a C.I.P. treatment.

The above objects and other objects and advantages of the present invention will become apparent from the detailed description which follows, taken in conjunction with the appended drawings.

DESCRIPTION OF THE PREFERRED EMBODIMENTS

Figure 1:
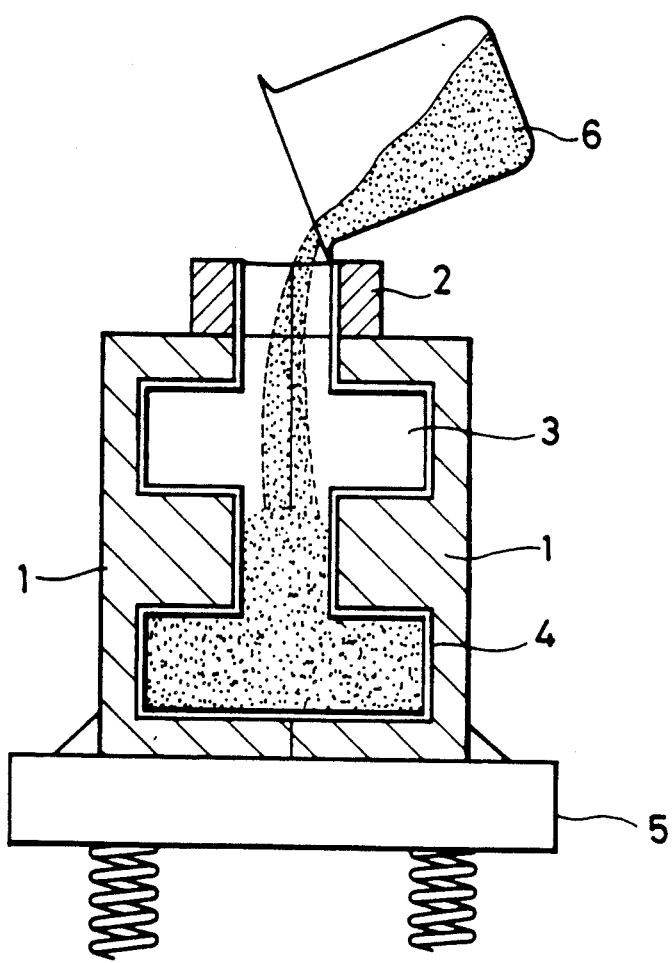
FIG. 1 is a vertical sectional view illustrating a mold used for the present invention.

An example of the present invention which is carried out to overcome the foregoing difficulties will be described. Materials used for said mold support can be selected from the group consisting of metal, resin, rubber, ceramics and wood. The mold support can be made by means of any of casting and machining. There is no limit to a method of making the mold support. The mold support can be easily made of metal such as aluminium, cast iron or the like, a resin such as urethane resin, epoxy resin or the like, a rubber such as urethane rubber, silicon rubber or the like or ceramics such as gypsum or the like.

The mold support determines the shape of the cavity and supports the thin-wall resilient mold so that it cannot be deformed. After the thin-wall resilient mold has been filled up with powder and air in the mold has been exhausted, the thin-wall resilient mold is separated from the mold support and subjected to the C.I.P. treatment. The thin-wall resilient mold prevents the pressure medium such as water, oil or the like from penetrating into the inside of the thin-wall resilient mold during the C.I.P. treatment. The thin-wall resilient mold also changes its shape by its elasticity in accord with its contraction due to the C.I.P. treatment and enables the powders to contract isostatically.

An appropriate adhesiveness between the thin-wall resilient mold and the mold support is required. The reason for this is as follows:

When powder materials are charged into the cavity of the thin-wall resilient mold, the thin-wall resilient mold is vibrated in many cases. When the thin-wall resilient mold is shifted from the mold support by vibration produced during charging of the powder materials, a predetermined shape cannot be obtained due to an unsatisfactory charging of the powder materials.

On the other hand, it is necessary to remove the mold support before subjecting the thin-wall resilient mold to the C.I.P. treatment after having exhausted air out of the thin-wall resilient mold filled up with powder materials and having sealed the thin-wall resilient mold. During removal of the mold support, the thin-wall resilient mold should not be impaired because an impaired thin-wall resilient mold cannot play its role as a mold in the C.I.P. treatment. Accordingly, the adhesiveness between the thin-wall resilient mold and the mold support should not be excessively strong.

The powder materials charged into the resilient mold contracts slightly during the exhaustion of air out of the resilient mold. In connection with this, the thin-wall resilient mold is most desired to be separated from the mold support. Accordingly, a weak adhesiveness between the thin-wall resilient mold and the mold support is desirable. An adhesive agent or a mold-releasing agent can previously be applied on the inner surfaces of the mold support to control the adhesiveness.

The thin-wall resilient mold of the present invention is a mold high in elasticity which is made of natural rubber or synthetic rubber such as styrene-butadiene rubber, polyisoprene rubber, isobutylene rubber, silicone rubber and urethane rubber or the like. A wall thickness of the thin-wall resilient mold varies dependent on sizes and shapes of the mold as an object. The wall thickness of the mold is desired to be usually within a range of 50 to 2000 μm. Latex is charged from an opening of the mold support into the mold support. Latex includes natural rubber latex and synthetic rubber latex. The latex is charged into the mold support up to a level high enough for the thin-wall resilient mold to be formed later to have its opening. Subsequently, the latex charged into the mold support is discharged out of the mold support and a film is formed on inner surfaces of the mold support. The film made of the latex is dried, by which a thin-wall resilient mold having an opening is formed. A thickness of the film can be increased if necessary by repeatedly carrying out a series of the steps of charging latex into the mold support, discharging the latex out of the mold support and drying a formed film made of the latex. A plurality of openings can be formed if necessary for forming a uniform film or charging powder materials depending on a shape of a mold.

Forming powder materials such as metallic powder, ceramic powder or the like are charged into a cavity of the thin-wall resilient mold thus obtained. The powder materials such as metallic powder, ceramic powder or the like can be any material, which can be molded by means of the C.I.P. treatment. For example, stainless steel powder, high-speed tool steel powder, a mixed powder of tungsten carbide-cobalt, alumina powder, silicon nitride powder, silicon carbide powder, titanium diboride powder or the like can be used. Those powders can be used by mixing two sorts of powders or more out of those powders. Spherical powders are desired. To obtain the spherical powders, powders can be pelletized. Powders of about 10 to 1000 μm in particle size are preferable. Various sorts of additives can be added to the powders responsive to properties required for the compact. In case the powder is silicon nitride powder, for example, alumina, yttria or the like is added to the powder in order to promote sintering of silicon nitride at a sintering step following the step of forming. The exhaustion of air out of the cavity can be carried out after having charged the powder materials into the cavity, but the exhaustion of air can be easily carried out when it is carried out simultaneously during charging of the powder materials into the cavity. A degree of air exhaustion is determined in accord with the purposes of the use of the compact. A high degree of vacuum is desired if it is economically allowable.

The thin-wall resilient mold holding powder materials, out of which air has been exhausted, is separated from the mold support and is subjected to the C.I.P. treatment. When the thin-wall resilient mold is removed after the C.I.P. treatment, a compact having contracted isotropically is obtained. Since an excessive protrusion is usually formed in a portion of an opening, this protrusion is removed.

Since the thin-wall resilient mold can be formed without producing any crease or any local stress on the surfaces of cavity inside the mold support according to the present invention, the compact obtained by the use of the C.I.P. treatment has no flaw on its surface and has a complete shape which is not substantially deformed. Such a compact can be obtained with good repeatability.

Example

Referring now specifically to the appended drawing, a specific example of the present invention will be described with figures. FIG. 1 is a vertical sectional view illustrating a mold for executing the method of the present invention. Latex of natural rubber was poured into a cavity formed by mold support 1 made of gypsum which was divided into two portions and part 2 for an opening which was divided into two portions. A liquid film was formed on the surfaces of the cavity by discharging the latex. Warm air of 50° C. was blown into the cavity, on the inner surfaces of which the liquid film was formed, for half an hour and the liquid film was dried. This procedure was repeatedly carried out 5 times and a thin-wall resilient mold 4 of 1 mm in thickness was formed. The thin-wall resilient mold was put on a vibration table 5. Granulated powder 6 sold on the market was charged into the cavity up to the opening, being vibrated.

Subsequently, an adapter (not shown) connected to a vacuum pump by means of a conduit was fitted to the opening of the thin-wall resilient mold and the inside of the thin-wall resilient mold was evacuated to 40 Torr. The part 2 for the opening was removed. A rubber of the thin-wall resilient mold just under the adapter was squeezed and clamped from the outside. Said adapter, which is made of porous ceramics and through which air is exhausted without passing through powders charged into the thin-wall resilient mold, is well-known.

During the evacuation of air, separation of rubber from gypsum due to a slight contraction of a fill-up was observed. As a result, the thin-wall resilient mold filled up with powder materials is taken out without any flaw by breaking the gypsum. The fill-up was subjected to the C.I.P. treatment at a pressure of 5000 kg/cm². A rubber film of the thin-wall resilient mold was separated and a compact was obtained. This compact contracted by 28.8% in a ratio of linear contraction relative to an inside dimension of the cavity, but it contracted uniformly and its transcription of a model was good. The above-described operation was repeated ten times. Repeatability was good and a good compact was obtained.

What is claimed is:

1. A method for molding powders to form a shaped compact comprising the steps of:
    forming a mold support having at least an opening and an inner surface defining a cavity;
    forming a film of natural or synthetic rubber latex on an inner surface of said mold support by pouring said latex through said opening into said cavity of the mold support and discharging a substantial portion of said latex poured into the cavity;
    forming a thin-wall resilient mold on said inner surface inside said cavity of mold support by drying said formed film of latex;
    charging powders as materials for a compact from said opening into said thin-wall resilient mold to fill said thin-wall resilient mold;
    exhausting air out of the thin-wall resilient mold filled with the powders through said opening and sealing the opening of said mold support to thereby seal the thin-wall resilient mold;
    separating said thin-wall resilient mold filled with the powders from said mold support; and
    subjecting said thin-wall resilient mold to a cold isostatic press treatment.

2. The method of claim 1, wherein the step of forming a film of natural or synthetic rubber latex on an inner surface of said mold support and the step of forming a thin-wall resilient mold inside said mold support are carried out at least two times.

3. The method of claim 1, wherein said thin-wall resilient mold has a thickness of 50 to 2000 μm.

4. The method of claim 1, which further comprises a step of forming a film made of mold-releasing agent on the inner surface of the mold support, following the step of forming the mold support.

5. The method of claim 4, wherein said film made of the mold-releasing agent is formed by charging the mold-releasing agent dissolved into a solvent into the mold support and then discharging the remaining mold-releasing agent out of the mold support.

6. The method of claim 1, which further comprises a step of forming a film made of an adhesive agent on the inner surface of the mold support, following the step of forming the mold support.

7. The method of claim 6, wherein said film made of adhesive agent is formed by pouring the adhesive agent dissolved into a solvent into the mold support and then discharging the remaining adhesive agent out of the mold support.

8. The method of claim 1, wherein said mold support is of a divisible type.

9. The method of claim 1, wherein said powders are spherical powders.

10. The method of claim 1, wherein said powders have a particle size of 10 to 1000 μm.

11. The method of claim 1, wherein said mold support is made of material selected from the group consisting of metal, resin, rubber, ceramics and wood.

12. The method of claim 11, wherein said metal is selected from the group consisting of aluminium and cast iron.

13. The method of claim 11, wherein said resin is epoxy resin.

14. The method of claim 11, wherein said rubber is selected from the group consisting of urethane rubber and silicone rubber.

15. The method of claim 11, wherein said ceramics are gypsum.

16. The method of claim 1, wherein said rubber latex is selected from the group consisting of styrene-butadiene rubber, polyisoprene rubber, isobutylene rubber, silicone rubber and urethane rubber latexes.

17. The method of claim 1, wherein said powders are selected from the group consisting of stainless steel powder, high-speed tool steel powder, a mixed powder of tungsten carbide-cobalt, alumina powder, silicon nitride powder, silicon carbide powder and titanium boride powder.

18. The method of claim 1, wherein said powders are silicon nitride powder which includes an additive selected from the group consisting of alumina and yttria.

19. The method of claim 1, wherein said mold support is made from gypsum and said mold support is divided into two portions.

20. The method of claim 2, wherein said thin-wall resilient mold has a thickness of 50 to 2000 μm,
    said mold support is of a divisible type,
    said powders are spherical powders having a particle size of 10 to 1000 μm and are selected from the group consisting of stainless steel powder, high-speed tool steel powder, a mixed powder of tungsten carbide-cobalt, alumina powder, silicon nitride powder, silicon carbide powder and titanium boride powder,
    said mold support is made of a material selected from the group consisting of aluminum, cast iron, epoxy resin, urethane rubber silicone rubber and gypsum and
    said rubber latex is selected from the group consisting of styrene-butadiene rubber, polyisoprene rubber, isobutylene rubber, silicone rubber and urethane rubber latexes.

21. The method of claim 20, which further comprises a step of forming a film made of a mold-releasing agent or an adhesive agent on the inner surface of the mold support, following the step of forming the mold support.

22. The method of claim 21, wherein said film made of the mold-releasing agent or the adhesive agent is formed by charging the mold-releasing agent or the adhesive agent dissolved into a solvent into the mold support and then discharging the remaining mold-releasing agent or adhesive agent out of the mold support.

23. The method of claim 8, wherein said mold support comprises at least first and second divisible portions which are separable for separating said thin-wall resilient mold from said mold support.

* * * * *